Aug. 27, 1968  T. N. W. LEIJON  3,398,472
SIDE OR FRONT DUMPING EXCAVATING BUCKET
WITH FRUSTO-CONICAL CHUTES
Filed June 13, 1966  2 Sheets-Sheet 1
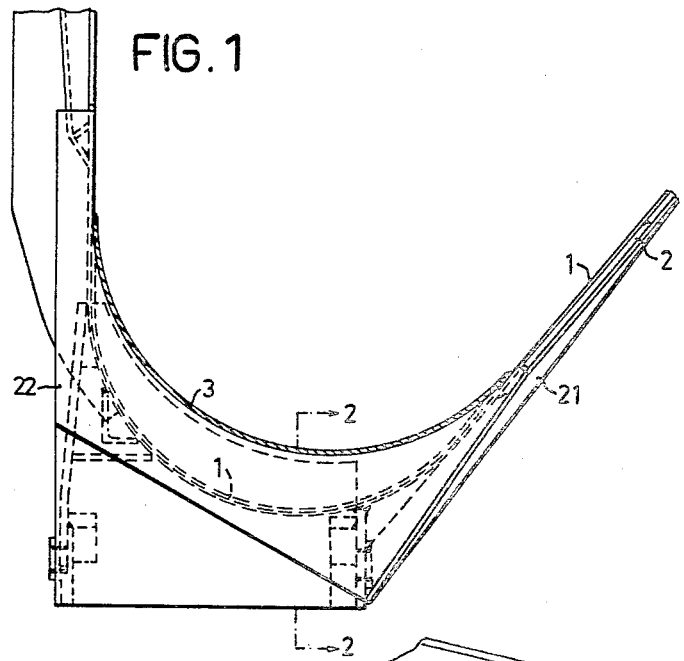
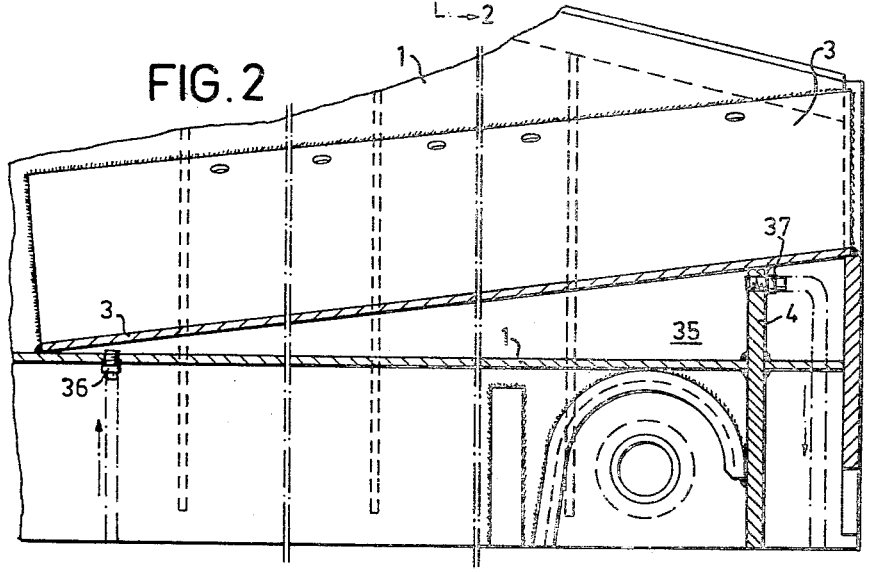

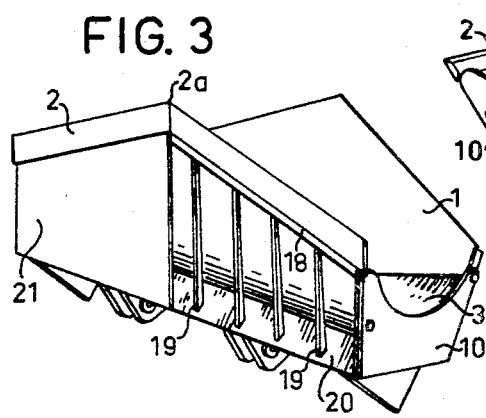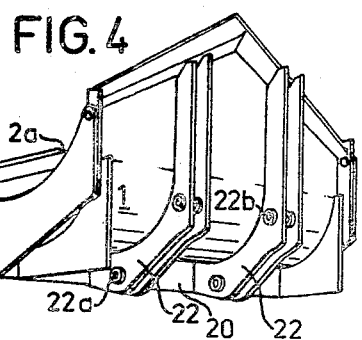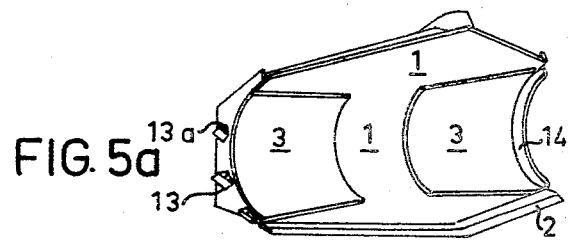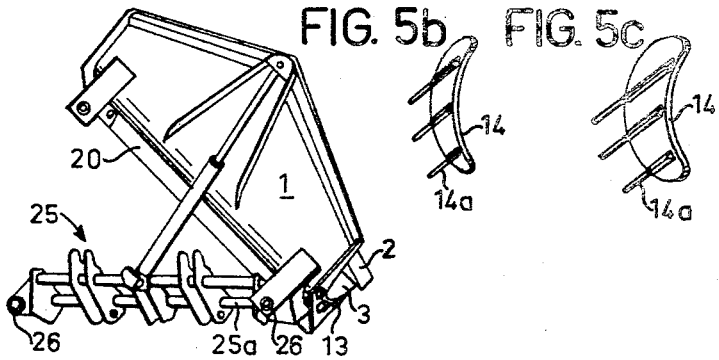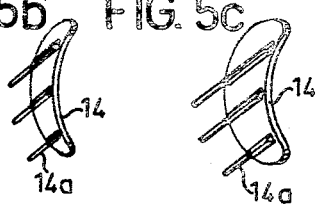

United States Patent Office 3,398,472
Patented Aug. 27, 1968

3,398,472
SIDE OR FRONT DUMPING EXCAVATING
BUCKET WITH FRUSTO-CONICAL CHUTES
Tage Nils Wilhelm Leijon, Sturevagen 18,
Stocksund, Sweden
Filed June 13, 1966, Ser. No. 557,245
Claims priority, application Sweden, June 24, 1965,
8,452/65
8 Claims. (Cl. 37—118)

ABSTRACT OF THE DISCLOSURE

This invention relates to an excavating bucket which is open at both ends and adapted to be carried upon and operated by a loading machine and to be tilted forwardly or laterally or both, said bucket being characterized in that it has a bottom surface that is inclined upwardly from the middle portion thereof toward both ends, said bottom surface being formed by securing inclined quadrangular plates to the bottom of a straight trough.

---

Such a bucket exhibits particularly good qualities for excavating and loading various materials when it is arranged either for front end dumping; positioned on a support of the loading machine unit, for example a tractor, or for front end as well as side dumping in one or preferably both directions and when it is carried on a support, provided with tipping bearings at its extremes, said support preferably being constructed in a way permitting it to swing about an horizontal axis to permit front end dumping forwardly of the machine. The bucket has a very ample width and extends on both sides beyond the wheels of the loading machine. Due to its open ends and its great width the bucket will encounter reduced excavating resistance and will have a high loading capacity and be especially suitable for side tipping because risk of damage to the wheels is absent.

Earlier known buckets as a rule have their bodies made of thick steel plate, which due to their special design has made them unnecessarily heavy and has contributed to problems making their construction expensive.

It is an object of this invention to provide a simplified and improved bucket of the kind indicated, which, in spite of thinner and more sparing dimensioning of the plate jacket of the bucket body resulting in a considerably reduced manufacturing cost, will exhibit increased rigidity and strength.

It is another object of this invention to provide a bucket which can be employed to advantage when handling hot material as when loading cinders, in foundries etc.

These and other objects will be realized by the present invention because of the characteristics incorporated into the same as indicated in the attached claims.

A few embodiments of the invention will be described in the following in connection with the attached drawings, on which FIG. 1 shows a side view of an embodiment of the invention. FIG. 2 shows a sectional view taken substantially along the line 2—2 in FIG. 1. FIG. 3 is a front view in perspective of a bucket arranged for front end tipping with the front protective plate partly removed and provided with lateral supports secured with bolts. FIG. 4 is a view in perspective of the bucket according to FIG. 3 seen from the rear. FIG. 5a is a perspective view showing a bucket for side and front tipping, seen from above, equipped for dismountable side supports. FIGS. 5b and 5c are perspective views of two side supports, which according to FIG. 5a may be alternatively fitted to the bucket. FIG. 6 is a view in perspective of the bucket according to FIG. 5a seen from the rear and provided with a tubular support, tipping bearings and a hydraulic jack for the tipping operation.

In all of the above mentioned embodiments the bucket body comprises a bottom plate 1 having been bent or rolled until acquiring U-shape cross-section or the form of a straight trough. The bottom plate is equipped with a front excavating edge 2 consisting of hard material, for example T1-steel. This edge is pointed forwards towards its center 2a.

Inside the jacket there are two quadrangular plates 3, each having the shape of a portion of a frusto-conical surface the inner end of which abuts against and is fastened to the central portion of the bottom plate, and the outer end of which is supported at a side of the bucket above the bottom plate. Here they are attached to and rest on support plates 4 incorporated into the body of the bucket in order to obtain an increase of the rigidity of its structure. The radius of the curvature of the plates 3 in a plane parallel to the direction of excavation and adjacent their outer edges is larger than the radius of curvature of the bottom plate in the same plane. Said radius of curvature increases progressively towards the ends, so that the plates, as stated above have the shape of portions of the curved surface of a frustum of a cone. Thus by way of example the bottom plate may have a curvature radius of 380 mm. and the parts 3 adjacent the central portion of the jacket bottom may have the same or a somewhat larger radius, so that the parts here will almost fit to the bottom plate. The radius of the plates 3 increases towards the ends, where the radius may reach a measurement of for instance 432 mm. The radius of the plates 3 may vary between about 1.0 and up to 2.0 and preferably up to 1.4 times the radius of the curvature of the bottom plate of the jacket.

The hollow chamber 35, which is defined by the bottom plate 1, a plate 3 and a part 4 (FIG. 2) may be utilized for the circulation of a cooling fluid. For this purpose, in one or several of the walls of the chamber, connections 36, 37 are provided for the supply and drawing off, respectively, of for example water, A bucket equipped in this way is particularly convenient for certain purposes, e.g. for loading of hot slags and ashes in foundries etc.

FIGS. 3 and 4 show a bucket provided with lateral supports 10 fitted with bolts, said supports being detachable. When put into place they contribute to increasing the loading capacity of the bucket, a larger quantity of material being retained. The curved outline of the lateral supports 10 prevents any significant increase of the resistance during the excavation operation.

In FIG. 5a another alternative embodiment is shown. The sides of the bucket are provided each with three supporting elements having the form of ears or blocks 13, provided with holes 13a. The lateral supports 14, approximately having the shape of a crescent moon, are provided with inserting pins 14a, which, when assembling the supports, will be introduced into the holes 13a. The lateral supports are closely fitted to and rest upon the end edges of the conical parts 3 and upon the interior face of the bottom plate 1.

FIG. 5c shows a lateral support of greater height than the one shown in FIG. 5b. The support acording to FIG. 5c is intended to be employed when loading light materials. It has been established that even though their height may be of modest proportion they contribute to a substantial increase of the loading capacity of the bucket, and therefore, if the supports are too high, there exists the risk of the machine turning over when loading heavy materials. However, when loading very light materials like snow, lateral supports may be used of still larger height than the ones shown in FIG. 5c.

The excavating edge 2 of the bucket at its extreme ends protrudes somewhat outside of the body of the bottom plate 1 and the conical parts 3 and in this way protects the lateral supports 10 and 14 during the excavating operation.

In FIG. 3 additional elements are shown, which have been incorporated in the body of the bucket in order to increase the rigidity of the same. From a narrow plate 18 parallel to the excavating edge 2 and positioned along the base of said edge a number of reinforcement ribs 19 extend down to the stress receiving plate 20, which extends all along the whole width of the plate jacket. An exterior protective plate 21 is provided to cover all of said plates and ribs, together constituting a box construction making the excavating side of the bucket very rigid.

Buckets intended exclusively for front tipping operations according to FIGS. 3 and 4 have the stress receiving plate 20 directly joined to parts serving the purpose of constituting a support for the bucket. As is most apparent in FIG. 4, supporting flanges 22 extend from the stress receiving plate 20 following the curvature of the bottom plate, these flanges being positioned in the same plane as the excavation direction. The flanges are provided with holes 22a, 22b for pivot pins and manipulation arms respectively. Strain, exercised against the excavating edge, is thus according to this embodiment transmitted to the carrier support of the bucket by the stress receiving plate 20.

The bucket according to FIG. 6 intended for side tipping is carried by a support 25, consisting of seamless tubes without welding joints, at its extreme ends, having alternative tipping brackets for the bucket provided with hydraulically actuated pins 26. In this embodiment the stress receiving plate 20 will have its position close to the front tube 25a of the carrier support and extends substantially along the whole length of the tube. When the bucket is in a locked excavation position the strain exercised against the excavating edge 2 is transmitted to the support 25 by the box construction and the stress receiving plate 20.

Variations in the design of different structural details of the invention are possible within the scope of the attached claims.

What I claim is:

1. An excavating bucket comprising a bottom plate in the form of a trough of substantially uniform curvature and two quadrangular plates in the form of sections of a frusto-conical surface each having substantially the same radius of curvature at one end edge thereof as said bottom plate and being secured at said end edge to the inner surface of said bottom plate adjacent the middle thereof, the other end edge of each quadrangular plate having a greater radius of curvature than said bottom plate and bridging across said trough adjacent an end thereof and the side edges of each of said quadrangular plates being secured to the inner surface of said bottom plate.

2. An excavating bucket as defined in claim 1 comprising support plates at right angles to the longitudinal axis of said trough and joined to said bottom plate and to said quadrangular plates adjacent to the ends thereof.

3. An excavating bucket as defined in claim 2 in which each closed space formed by said bottom plate, said quadrangular plates and said support plates is provided with an inlet and an outlet for a cooling fluid.

4. An excavating bucket as defined in claim 1 in which the radius of curvature of said quadrangular plates adjacent to the ends of said bottom plate is from 1.05 to 2.0 times the radius of curvature of said bottom plate.

5. An excavating bucket as defined in claim 1 comprising a strain receiving plate extending parallel to the longitudinal axis of said bottom plate and secured to the lower surface thereof, an excavation edge secured to the front edge of said bottom plate and reinforcing ribs secured to the outer surface of said bottom plate and extending between said excavation edge and said strain receiving plate.

6. An excavating bucket as defined in claim 5 comprising a cover plate extending from said excavating edge to said strain receiving plate over said reinforcing ribs.

7. An excavating bucket as defined in claim 6 comprising a beam to which said bucket is attached for tilting movement, said strain receiving plate being supported by said beam when said bucket is in excavating position.

8. An excavating bucket as defined in claim 6 comprising supporting flanges extending around the curved surface of said bottom plate from said strain receiving plate to the rear edge thereof.

References Cited

UNITED STATES PATENTS

| | | | |
|---|---|---|---|
| 2,924,345 | 2/1960 | Bodin | 37—117.5 XR |
| 3,022,910 | 2/1962 | Anderson et al. | 214—768 |
| 3,034,237 | 5/1962 | Wolfe et al. | 37—118 XR |
| 3,223,262 | 12/1965 | Orwig | 214—768 |
| 3,268,101 | 8/1966 | Pensa | 214—768 XR |
| 3,312,364 | 4/1967 | Granryd | 214—768 |

FOREIGN PATENTS 1,380,823  10/1964  France.

ROBERT E. PULFREY, *Primary Examiner.*

E. S. BURR, *Assistant Examiner.*